No. 717,959. PATENTED JAN. 6, 1903.
O. D. WOODRUFF.
FOOD CHOPPER.
APPLICATION FILED MAY 26, 1902.
NO MODEL.
Fig. 1
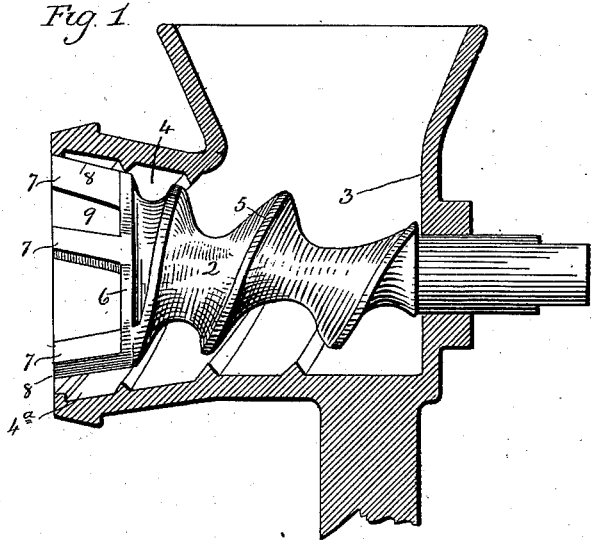
Fig. 2
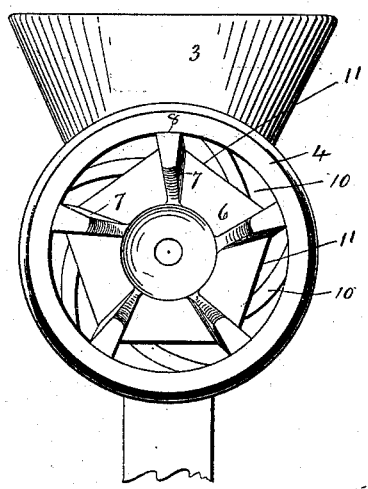
Fig. 3
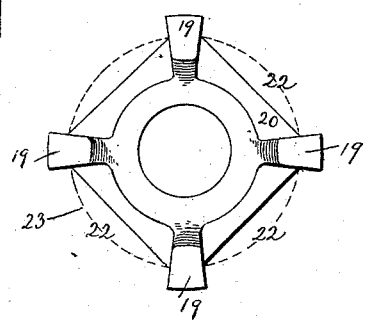
Fig. 4
Fig. 5
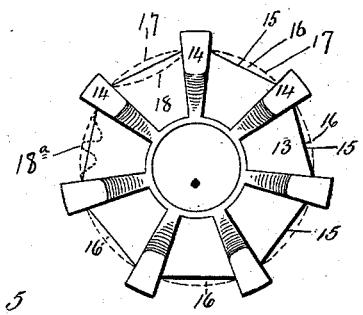
Witnesses: Oliver D. Woodruff, Inventor
THE NORRIS PETERS CO., PHOTO-LITHO., WASHINGTON, D. C.

UNITED STATES PATENT OFFICE.

OLIVER D. WOODRUFF, OF SOUTHINGTON, CONNECTICUT.

FOOD-CHOPPER.

SPECIFICATION forming part of Letters Patent No. 717,959, dated January 6, 1903.

Application filed May 26, 1902. Serial No. 108,928. (No model.)

*To all whom it may concern:*

Be it known that I, OLIVER D. WOODRUFF, of Southington, in the county of Hartford and State of Connecticut, have invented a new and useful Improvement in Food-Choppers; and I do hereby declare the following, when taken in connection with the accompanying drawings and the numerals of reference marked thereon, to be a full, clear, and exact description of the same, and which said drawings constitute part of this specification, and represent, in—

Figure 1, a broken view, in vertical section, of one form which a food-chopper constructed in accordance with my invention may assume; Fig. 2, a detached view, in end elevation, of the forcer thereof; Fig. 3, a broken view of the device in end elevation; Fig. 4, a detached end view of a modified form of forcer; Fig. 5, a similar view of another form of forcer.

This invention relates to an improvement in food-choppers, the object being to produce a simple and compact device composed of few parts and constructed with particular reference to increased capacity for work, to ease of operation, and to cutting without mashing or pulping the food.

With these ends in view my invention consists in a food-chopper having certain details of construction and combinations of parts, as will be hereinafter described, and pointed out in the claims.

In carrying out my invention, as herein shown, I employ a tapering forcer 2, located in a case 3, the forcer-chamber 4 of which is internally tapered to correspond to the external taper of the forcer, which is formed with a screw-like rib 5, terminating near its forward end in the inner face of a substantially flat head 6, located in a plane at a right angle to the longitudinal axis of the forcer. From the outer face of the said head 6 five cutting-arms 7 project forwardly and incline outwardly to conform to the internal taper of the forcer-chamber 4, the delivery end of which they occupy, their outer faces 8 being correspondingly curved, so as to lie in the same circle, and adapted to coact with the terminals of the ribs 4ᵃ of the forcer-chamber 4 in the final cutting of the food. The space 9, inclosed by these arms 7, constitutes the final cutting-chamber of the device, this space lying entirely in front of the forward face of the said head 6. To the rear of the said head preliminary cutting is done by the said rib 5 of the forcer and the said ribs 4ᵃ. When the forcer 2 is in place in the case 3, the outer ends of the cutting-arms 7 are flush with the delivery end thereof, as clearly shown by Fig. 1. The final cutting of the food takes place, as aforesaid, in the said chamber 9, and in order that the partially cut or stripped-up food may have free passage thereinto I make the head 6 of the forcer non-cylindrical in form by, in effect, cutting away portions of its outer edge or periphery at points between the bases of the cutting-arms 7, so that feeding-spaces 10 will be formed between the periphery or edge of said head and that portion of the interior wall of the forcer-chamber 4 lying in the vertical plane of the head when the forcer is in position. Thus when the forcer is provided with five cutting-arms 7 the periphery of the head 6 may be cut away between them on straight lines or flattened, as at 11, so as to give the head a pentagonal form. The broken circle 12 in Fig. 2 shows to what extent the edge or periphery of the head 6 is cut away, or, in other words, how far it departs in form from a true circle intersecting the very slightly curved outer faces of all of the cutting-arms 7 at their inner ends or bases which merge into the periphery of the said head. The feeding-spaces 10 thus formed permit the partially-cut food to pass freely over the edge of the head 6 into the cutting-chamber 9, where the final cutting of the food takes place, whereby the capacity of the device for work is increased, its action made free and easy, and the pulping of the food avoided.

In the construction shown by Fig. 4 of the drawings the head 13 of the forcer is provided with seven forwardly-projecting outwardly-inclined cutting-arms 14, between the bases or inner ends of which the periphery or edge of the head is cut away on straight lines, as at 15, to form feeding-spaces 16, the size of which is shown by a broken circle 17, intersecting the very slightly curved outer faces of all of the arms 14 at their inner ends or bases, which merge into the edge or periphery of the head 13 of the forcer. In this construction the head may be said to be heptagonal in form.

The modified form of forcer shown by Fig. 5 has four forwardly-projecting outwardly-inclined cutting-arms 19, located at the four corners of the quadrangular head 20 of a forcer, the size of the feeding-spaces 22 between the bases or inner ends of the arms 19 being indicated by a broken circle 23.

The shape of the feeding-spaces may be varied in form, if desired. Thus the edge of the head may be cut away between the arms on a curved line, such as the broken line 18 on Fig. 4, or on a waved line, such as the broken line 18$^a$ on the same figure, or in some equivalent way. It thus appears that the number of cutting-arms on forcers constructed in accordance with my invention may be varied and that the manner of cutting away the edges of the forcers between their arms may also be varied, so as to vary the form of the feeding-spaces. I would therefore have it understood that I do not limit myself to the exact construction shown and described, but hold myself at liberty to make such variations therefrom as fairly fall within the spirit and scope of my invention. Thus while I have shown and described a tapering forcer and a tapering forcer-chamber I might employ some other form.

Having fully described my invention, what I claim as new, and desire to secure by Letters Patent, is—

1. In a food-chopper, the combination with a case having a tapering forcer-chamber containing ribs, of a tapering forcer coacting with such ribs in the preliminary cutting of the food, and formed with a head located in a plane at a right angle to its longitudinal axis and having a plurality of forwardly-projecting and outwardly-inclined cutting-arms the outer edges of which coact with the ribs in the delivery end of the said forcer-chamber for the final cutting of the food, the said head being non-cylindrical in form to provide feeding-spaces between its edge and the forcer-chamber for the free passage of the partially-cut food therefrom into the final cutting-chamber which is located within the said arms and lies forward of the said head.

2. In a food-chopper, the combination with a case having a tapering forcer-chamber containing ribs, of a tapering forcer coacting with such ribs in the preliminary cutting of the food, and formed with a head located in a plane at a right angle to its longitudinal axis and having a plurality of outwardly-inclined forwardly-projecting cutting-arms, the outer edges of which coact with ribs in the delivery end of the forcer-chamber for the final cutting of the food, the said head being non-cylindrical in form to provide feeding-spaces between its edge and the said chamber for the free passage of the partially-cut food into the final cutting-chamber which is located within the said arms and which lies forward of the said head of the forcer, and the said feeding-spaces being located between the inner ends or bases of the said cutting-arms.

In testimony whereof I have signed this specification in the presence of two subscribing witnesses.

OLIVER D. WOODRUFF.

Witnesses:
   G. D. SEYMOUR,
   FREDERIC C. EARLE.